(12) United States Patent
Oasa

(10) Patent No.: US 10,829,909 B2
(45) Date of Patent: Nov. 10, 2020

(54) WORK VEHICLE AND CONTROL METHOD FOR WORK VEHICLE

(71) Applicant: KOMATSU LTD., Tokyo (JP)

(72) Inventor: Takahisa Oasa, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 16/620,729

(22) PCT Filed: Jan. 21, 2019

(86) PCT No.: PCT/JP2019/001671
§ 371 (c)(1),
(2) Date: Dec. 9, 2019

(87) PCT Pub. No.: WO2019/159607
PCT Pub. Date: Aug. 22, 2019

(65) Prior Publication Data
US 2020/0102719 A1 Apr. 2, 2020

(30) Foreign Application Priority Data

Feb. 14, 2018 (JP) ................................ 2018-024373

(51) Int. Cl.
*E02F 9/22* (2006.01)
*F16H 61/4035* (2010.01)
(Continued)

(52) U.S. Cl.
CPC .......... *E02F 9/2253* (2013.01); *E02F 9/2296* (2013.01); *F16H 61/4035* (2013.01);
(Continued)

(58) Field of Classification Search
CPC .. E02F 9/2253; E02F 9/2296; F16H 61/4035; F16H 61/4043; F16H 61/433; F16H 61/465; F16H 61/423; F16H 61/21
See application file for complete search history.

(56) References Cited

U.S. PATENT DOCUMENTS 5,123,244 A * 6/1992 Kita ...................... F16H 61/433
60/452
8,769,945 B2 * 7/2014 Shirao ................. F16H 61/4061
60/444
(Continued)

FOREIGN PATENT DOCUMENTS

CN 105492278 A 4/2016
DE 10 2014 211 394 A1 12/2014
(Continued)

OTHER PUBLICATIONS

The International Search Report for the corresponding international application No. PCT/JP2019/001671, dated Apr. 16, 2019.
(Continued)

*Primary Examiner* — Abiy Teka
(74) *Attorney, Agent, or Firm* — Global IP Counselors, LLP

(57) ABSTRACT

A controller determines a target rotation speed of an engine from an operation amount of an accelerator operating member. The controller determines whether a vehicle is in coasting deceleration. The controller decreases a differential pressure between a first circuit and a second circuit of a hydraulic circuit according to a deviation between an actual rotation speed of the engine and the target rotation speed, or the operation amount of the accelerator operating member when the vehicle is in the coasting deceleration.

10 Claims, 15 Drawing Sheets

(51) Int. Cl.
  *F16H 61/4043*   (2010.01)
  *F16H 61/433*    (2010.01)
  *F16H 61/465*    (2010.01)
  *E02F 3/28*      (2006.01)

(52) U.S. Cl.
  CPC ....... *F16H 61/4043* (2013.01); *F16H 61/433* (2013.01); *F16H 61/465* (2013.01); *E02F 3/283* (2013.01)

(56) References Cited

U.S. PATENT DOCUMENTS

| | | | |
|---|---|---|---|
| 9,120,658 B2* | 9/2015 | Kaneko | B66F 9/07572 |
| 9,540,011 B2* | 1/2017 | Kaneko | B60W 30/188 |
| 2013/0136624 A1* | 5/2013 | Kitao | E02F 9/2289 |
| | | | 417/212 |
| 2014/0372000 A1 | 12/2014 | Rozycki et al. | |
| 2015/0135695 A1 | 5/2015 | Thekanath et al. | |
| 2016/0025215 A1 | 1/2016 | Thoms et al. | |
| 2017/0101763 A1 | 4/2017 | Nishimura | |

FOREIGN PATENT DOCUMENTS

| | | |
|---|---|---|
| JP | 60-189635 A | 9/1985 |
| JP | 5-306768 A | 11/1993 |
| JP | 6-249339 A | 9/1994 |
| JP | 2013-190088 A | 9/2013 |
| JP | 2016-44714 A | 4/2016 |

OTHER PUBLICATIONS

The Office Action for the corresponding Chinese application No. 201980002982.9, dated Aug. 26, 2020.

* cited by examiner

WORK VEHICLE AND CONTROL METHOD FOR WORK VEHICLE

CROSS-REFERENCE TO RELATED APPLICATIONS

This application is a U.S. National stage application of International Application No. PCT/JP2019/001671, filed on Jan. 21, 2019. This U.S. National stage application claims priority under 35 U.S.C. § 119(a) to Japanese Patent Application No. 2018-024373, filed in Japan on Feb. 14, 2018, the entire contents of which are hereby incorporated herein by reference.

BACKGROUND

Fields of the Invention

The present invention relates to a work vehicle and a control method for a work vehicle.

Background Information

Some work vehicles include a hydrostatic transmission. The hydrostatic transmission includes a travel pump, a travel motor, and a hydraulic circuit that connects the travel pump and the travel motor. The travel pump is driven by an engine and discharges hydraulic fluid. The hydraulic fluid discharged from the travel pump is supplied to the travel motor through the hydraulic circuit. The travel motor is driven by hydraulic fluid from the travel pump. The travel motor is connected to a traveling device of the work vehicle, and the work vehicle travels by driving the travel motor. In the hydrostatic transmission, the transmission ratio can be controlled by controlling the displacement of the travel pump and the displacement of the travel motor.

SUMMARY

In a work vehicle equipped with a hydrostatic transmission, when the operator turns off the accelerator pedal, the engine brake as well as the hydrostatic transmission brake also act. Therefore, the work vehicle equipped with the hydrostatic transmission tends to have a stronger deceleration as compared with the work vehicle equipped with the torque converter. Therefore, in order to perform the coasting travel gently, the operator needs to perform the adjustment such as gradually loosening the accelerator pedal, and the operation is complicated.

In addition, when the vehicle travels downhill, the accelerator pedal can be turned off in a work vehicle equipped with a torque converter. On the other hand, in a work vehicle equipped with a hydrostatic transmission, the brake by the hydrostatic transmission is too strong, so that the vehicle stops when the accelerator pedal is off during downhill travel. Therefore, it is necessary for the operator to actively increase the engine rotation speed by depressing the accelerator pedal, and the fuel efficiency is lowered.

It is an object of the present invention to provide a work vehicle which can easily perform gentle coasting travel and improve fuel consumption.

A work vehicle according to a first aspect includes an engine, a hydrostatic transmission, an engine rotation speed sensor, an accelerator operating member, an accelerator operation sensor, and a controller. The hydrostatic transmission includes a travel pump, a hydraulic circuit, and a travel motor. The travel pump includes a first pump port and a second pump port, and is driven by the engine. The hydraulic circuit is connected to the travel pump. The travel motor includes a first motor port and a second motor port, and is connected to the travel pump through the hydraulic circuit. The hydraulic circuit includes a first circuit connecting the first pump port and the first motor port, and a second circuit connecting the second pump port and the second motor port. The engine rotation speed sensor outputs a signal indicative of an actual engine speed. The accelerator operation sensor outputs a signal indicative of an operation amount of the accelerator operating member. The controller receives the signal from the engine rotation speed sensor and the signal from the accelerator operation sensor. The controller determines a target rotation speed of the engine from the operation amount of the accelerator operating member. The controller determines whether the vehicle is in coasting deceleration. The controller decreases a differential pressure between the first circuit and the second circuit in accordance with a deviation between the actual rotation speed of the engine and the target rotation speed or the operation amount of the accelerator operating member when the vehicle is in the coasting deceleration.

In the work vehicle according to the present aspect, during the coasting deceleration, the brake torque by the hydrostatic transmission is reduced by decreasing the differential pressure between the first circuit and the second circuit in accordance with the deviation between the actual rotation speed of the engine and the target rotation speed, or the operation amount of the accelerator operating member. As a result, it is possible to easily carry out a gentle coasting travel. Further, the fuel efficiency can be improved by increasing the chances of the work vehicle traveling in a state where the accelerator operating member is turned off.

The controller may determine that the vehicle is in the coasting deceleration when the actual rotation speed is greater than the target rotation speed. In this case, it is possible to accurately determine that the vehicle is in the coasting deceleration.

The controller may slow down a rate of decrease in a command value of a target displacement of the travel pump when the vehicle is in the coasting deceleration. In this case, it is possible to reduce the differential pressure between the first circuit and the second circuit by reducing the rate of decrease in the displacement of the travel pump.

The controller may include a low pass filter. The controller may output a command signal indicative of the target displacement to the travel pump through the low-pass filter. The controller may reduce a cut-off frequency of the low-pass filter according to the deviation between the actual rotation speed of the engine and the target rotation speed or the operation amount of the accelerator operating member when the vehicle is in the coasting deceleration. In this case, by decreasing the cut-off frequency of the low-pass filter, it is possible to slow down the rate of decrease in the displacement of the travel pump.

The hydrostatic transmission may further comprise a relief valve. The relief valve may be provided in the hydraulic circuit and may be capable of changing a relief pressure. The controller may reduce the relief pressure according to the deviation between the actual rotation speed of the engine and the target rotation speed or the operation amount of the accelerator operating member when the vehicle is in the coasting deceleration. In this case, by reducing the relief pressure, it is possible to reduce the differential pressure between the first circuit and the second circuit.

When the vehicle is in the coasting deceleration, the controller may decrease a lower limit value of the displacement of the travel motor in comparison with a normal state in which the vehicle is not in the coasting deceleration and decrease the lower limit value of the displacement of the travel motor in accordance with an increase in the deviation between the actual rotation speed and the target rotation speed of the engine or a decrease in the operation amount of the accelerator operating member. In this case, since the lower limit value of the displacement of the travel motor is made smaller than that in the normal state, it is possible to reduce the braking torque by the hydrostatic transmission. Further, since the lower limit value of the motor displacement becomes larger as the deviation becomes smaller or the operation amount of the accelerator operating member becomes larger, the displacement of the travel motor can be smoothly changed when the control during the coasting deceleration ends and the control returns to the normal state.

A work vehicle according to a second aspect includes an engine, a hydrostatic transmission, an engine rotation speed sensor, an accelerator operating member, an accelerator operation sensor, and a controller. The hydrostatic transmission includes a travel pump, a hydraulic circuit, and a travel motor. The travel pump is driven by the engine. The hydraulic circuit is connected to the travel pump. The travel motor is connected to the travel pump through the hydraulic circuit. The engine rotation speed sensor outputs a signal indicative of an actual rotation speed of the engine. The accelerator operation sensor outputs a signal indicative of an operation amount of the accelerator operating member. The controller receives the signal from the engine rotation speed sensor and the signal from the accelerator operation sensor. The controller determines a target rotation speed of the engine from the operation amount of the accelerator operating member. The controller determines whether the vehicle is in coasting deceleration. When the vehicle is in the coasting deceleration, the controller decreases a lower limit value of the displacement of the travel motor in accordance with a deviation between the actual rotation speed of the engine and the target rotation speed, or the operation amount of the accelerator operating member.

In the work vehicle according to the present aspect, during the coasting deceleration, the brake torque by the hydrostatic transmission is reduced by decreasing the lower limit value of the displacement of the travel motor in accordance with the deviation between the actual rotation speed and the target rotation speed of the engine, or the operation amount of the accelerator operating member. As a result, it is possible to easily carry out a gentle coasting travel. Further, the fuel efficiency can be improved by increasing the chances of the work vehicle traveling in a state where the accelerator operating member is turned off.

The controller may determine that the vehicle is in the coasting deceleration when the actual rotation speed is greater than the target rotation speed. In this case, it is possible to accurately determine that the vehicle is in the coasting deceleration.

A method according to a third aspect is a method performed by a controller to control a work vehicle. The work vehicle comprises an engine, a hydrostatic transmission, and an accelerator operating member. The hydrostatic transmission includes a travel pump, a hydraulic circuit, and a travel motor. The travel pump includes a first pump port and a second pump port and is driven by the engine. The hydraulic circuit is connected to the travel pump. The travel motor includes a first motor port and a second motor port, and is connected to the travel pump through the hydraulic circuit. The hydraulic circuit includes a first circuit connecting the first pump port and the first motor port, and a second circuit connecting the second pump port and the second motor port.

The control method according to the present aspect comprises the following processing. A first process is to receive a signal indicative of an operation amount of the accelerator operating member. A second process is to receive a signal indicative of an actual rotation speed of the engine. A third process is to determine a target rotation speed of the engine from the operation amount of the accelerator operating member. A fourth process is to determine whether the vehicle is in coasting deceleration. A fifth process is to reduce a differential pressure between the first circuit and the second circuit in accordance with a deviation between the actual rotation speed of the engine and the target rotation speed, or the operation amount of the accelerator operating member when the vehicle is in the coasting deceleration.

In the method according to the present aspect, during the coasting deceleration, the brake torque by the hydrostatic transmission is reduced by decreasing the differential pressure between the first circuit and the second circuit in accordance with the deviation between the actual rotation speed of the engine and the target rotation speed, or the operation amount of the accelerator operating member. As a result, it is possible to easily carry out a gentle coasting travel. Further, the fuel efficiency can be improved by increasing the chances of the work vehicle traveling in a state where the accelerator operating member is turned off.

A method according to a fourth aspect is a method performed by a controller to control a work vehicle. The work vehicle comprises an engine, a hydrostatic transmission, and an accelerator operating member. The hydrostatic transmission includes a travel pump, a hydraulic circuit, and a travel motor. The travel pump is driven by the engine. The hydraulic circuit is connected to the travel pump. The travel motor is connected to the travel pump through the hydraulic circuit.

The control method according to the present aspect includes the following processing. A first process is to receive a signal indicative of an operation amount of the accelerator operating member. A second process is to receive a signal indicative of an actual rotation speed of the engine. A third process is to determine a target rotation speed of the engine from the operation amount of the accelerator operating member. A fourth process is to determine whether the vehicle is in coasting deceleration. A fifth process is to reduce a lower limit value of a displacement of the travel motor in accordance with a deviation between the actual rotation speed of the engine and the target rotation speed, or the operation amount of the accelerator operating member when the vehicle is in the coasting deceleration.

In the method according to the present aspect, during the coasting deceleration, the brake torque by the hydrostatic transmission is reduced by decreasing the lower limit value of the displacement of the travel motor in accordance with the deviation between the actual rotation speed and the target rotation speed of the engine, or the operation amount of the accelerator operating member. As a result, it is possible to easily carry out a gentle coasting travel. Further, the fuel efficiency can be improved by increasing the chances of the work vehicle traveling in a state where the accelerator operating member is turned off.

Effect of the Invention

According to the present invention, in the work vehicle, it is possible to easily carry out the gentle coasting travel and improve the fuel consumption.

DETAILED DESCRIPTION OF EMBODIMENT(S)

Figure 1:
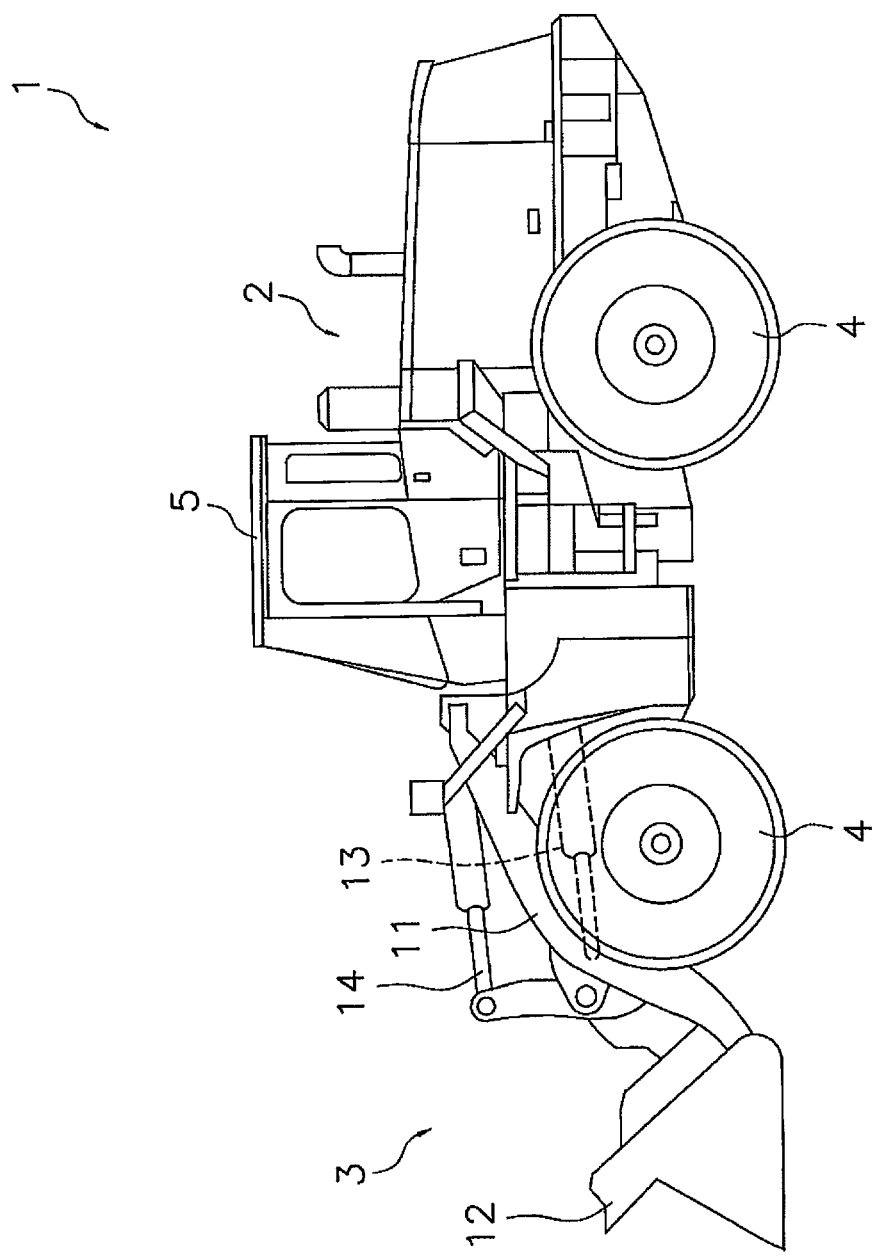
FIG. 1 is a side view of a work vehicle according to an embodiment.

Hereinafter, a work vehicle 1 according to an embodiment of the present invention will be explained with reference to the drawings. FIG. 1 is a side view of the work vehicle 1. The work vehicle 1 is a wheel loader. The work vehicle 1 includes a vehicle body 2, a work implement 3, a plurality of traveling wheels 4, and a cab 5. The work implement 3 is mounted on a front portion of the vehicle body 2. The work implement 3 includes a boom 11, a bucket 12, a lift cylinder 13 and a bucket cylinder 14.

The boom 11 is rotatably attached to the vehicle body 2. The boom 11 is driven by the lift cylinder 13. The bucket 12 is rotatably attached to the boom 11. The bucket 12 is moved up and down by a bucket cylinder 14. The cab 5 is disposed on the vehicle body 2. The plurality of traveling wheels 4 are rotatably attached to the vehicle body 2.

Figure 2:
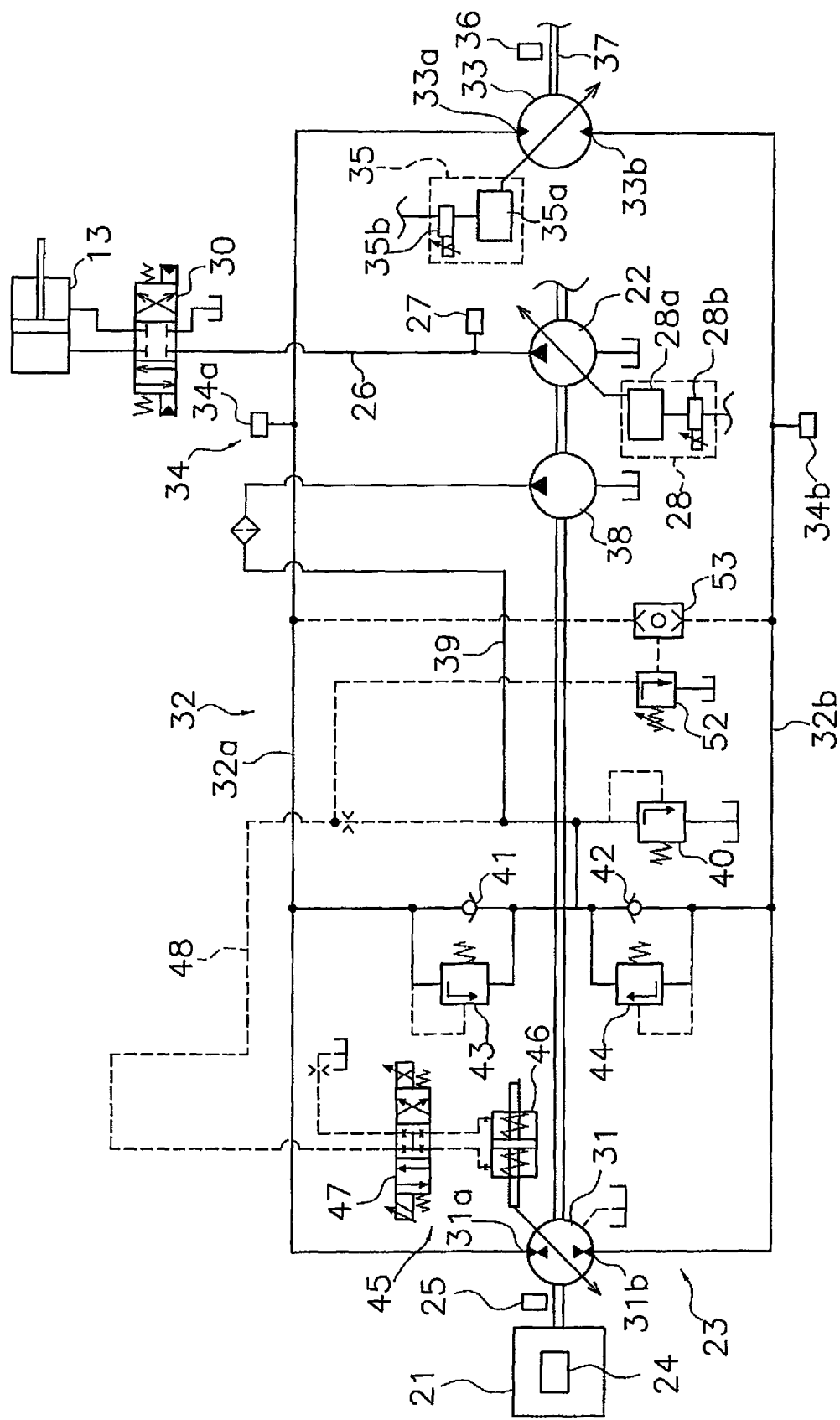
FIG. 2 is a block diagram showing a configuration of a drive system of the work vehicle.

FIG. 2 is a block diagram showing the configuration of a drive system mounted on the work vehicle 1. The work vehicle 1 includes an engine 21, a work implement pump 22, and a hydrostatic transmission (hereinafter referred to as "HST") 23. The engine 21 is, for example, a diesel engine. The fuel injection device 24 controls the amount of fuel injected to the engine 21, thereby controlling the output torque of the engine 21 (hereinafter referred to as "engine torque") and the rotation speed. The actual rotation speed of the engine 21 is detected by the engine rotation speed sensor 25. The engine rotation speed sensor 25 outputs a signal indicative of the actual rotation speed of the engine 21.

The work implement pump 22 is connected to the engine 21. The work implement pump 22 is driven by the engine 21, thereby discharging the hydraulic fluid. The hydraulic fluid discharged from the work implement pump 22 is supplied to the lift cylinder 13 through the work implement hydraulic circuit 26. As a result, the work implement 3 is driven. The discharge pressure of the work implement pump 22 is detected by a pressure sensor 27 for the work implement pump. The pressure sensor 27 for the work implement pump outputs a signal indicative of the discharge pressure of the work implement pump 22.

The work implement pump 22 is a variable displacement hydraulic pump. A pump displacement control device 28 is connected to the work implement pump 22. The pump displacement control device 28 controls the displacement of the work implement pump 22. The pump displacement control device 28 includes a servo piston 28a and a pump control valve 28b. The servo piston 28a is connected to the work implement pump 22. The servo piston 28a changes the tilt angle of the work implement pump 22, thereby changing the displacement of the work implement pump 22. The pump control valve 28b controls the operation of the servo piston 28a by controlling the hydraulic pressure supplied to the servo piston 28a. The work implement pump 22 may be a fixed displacement hydraulic pump.

A work implement control valve 30 is disposed in the work implement hydraulic circuit 26. The work implement control valve 30 controls the flow rate of the hydraulic fluid supplied to the lift cylinder 13 according to the pilot pressure applied to the work implement control valve 30. Although not shown, the work implement control valve 30 may control the flow rate of the hydraulic fluid supplied to the bucket cylinder 14. The flow rate of the hydraulic fluid means the amount of the hydraulic fluid supplied per unit time. The work implement control valve 30 is not limited to a control valve of a hydraulic pilot, and may be an electro-magnetically controlled valve that is electrically controlled.

The HST 23 includes a travel pump 31, a drive hydraulic circuit 32, and a travel motor 33. The travel pump 31 is connected to the engine 21. The travel pump 31 is driven by the engine 21 to discharge hydraulic fluid. The travel pump 31 is a variable displacement hydraulic pump. The hydraulic fluid discharged from the travel pump 31 is sent to the travel motor 33 through the drive hydraulic circuit 32.

The drive hydraulic circuit 32 connects the travel pump 31 and the travel motor 33. The drive hydraulic circuit 32 includes a first drive circuit 32a and a second drive circuit 32b. The first drive circuit 32a connects a first pump port 31a of the travel pump 31 and a first motor port 33a of the travel motor 33. The second drive circuit 32b connects a second pump port 31b of the travel pump 31 and a second motor port 33b of the travel motor 33. The travel pump 31, the travel motor 33, the first drive circuit 32a, and the second drive circuit 32b are configured as a closed circuit.

The hydraulic fluid is supplied from the travel pump 31 to the travel motor 33 through the first drive circuit 32a, whereby the travel motor 33 is driven in one direction, for example, the forward direction. In this case, the hydraulic fluid returns from the travel motor 33 to the travel pump 31 through the second drive circuit 32b. The hydraulic fluid is supplied from the travel pump 31 to the travel motor 33 through the second drive circuit 32b, whereby the travel motor 33 is driven in the other direction, for example, the reverse direction. In this case, the hydraulic fluid returns from the travel motor 33 to the travel pump 31 through the first drive circuit 32a.

The drive hydraulic circuit 32 is provided with a drive circuit pressure sensor 34. The drive circuit pressure sensor 34 detects the pressure of the hydraulic fluid supplied to the travel motor 33 through the first drive circuit 32a or the second drive circuit 32b. Specifically, the drive circuit pressure sensor 34 includes a first circuit pressure sensor 34a and a second circuit pressure sensor 34b.

The first circuit pressure sensor 34a detects the hydraulic pressure of the first drive circuit 32a. The second circuit pressure sensor 34b detects the hydraulic pressure of the second drive circuit 32b. The first circuit pressure sensor 34a outputs a signal indicative of the hydraulic pressure of the first drive circuit 32a. The second circuit pressure sensor 34b outputs a signal indicative of the hydraulic pressure of the second drive circuit 32b.

The travel motor 33 is a variable displacement hydraulic motor. The travel motor 33 is driven by the hydraulic fluid discharged from the travel pump 31, and generates a driving force for traveling. A motor displacement control device 35 is connected to the travel motor 33. The motor displacement control device 35 controls the displacement of the travel motor 33. The motor displacement control device 35 includes a motor cylinder 35a and a motor control valve 35b.

The motor cylinder 35a is connected to the travel motor 33. The motor cylinder 35a is driven by hydraulic pressure, and changes the tilt angle of the travel motor 33. The motor control valve 35b is an electromagnetic proportional control valve that is controlled based on a command signal input to the motor control valve 35b. When the motor control valve 35b operates the motor cylinder 35a, the displacement of the travel motor 33 is changed.

The travel motor 33 is connected to the drive shaft 37. The drive shaft 37 is connected to the above-mentioned traveling wheel 4 via an axle (not shown). The rotation of the travel motor 33 is transmitted to the traveling wheels 4 through the drive shaft 37. Thereby, the work vehicle 1 travels.

The work vehicle 1 is provided with a vehicle speed sensor 36. The vehicle speed sensor 36 detects the vehicle speed. The vehicle speed sensor 36 outputs a signal indicative of the vehicle speed. For example, the vehicle speed sensor 36 detects the rotation speed of the drive shaft 37 to thereby detect the vehicle speed.

The HST 23 includes a charge pump 38 and a charge circuit 39. The charge pump 38 is a fixed displacement hydraulic pump. Charge pump 38 is connected to engine 21. The charge pump 38 is driven by the engine 21 to supply the hydraulic fluid to the drive hydraulic circuit 32.

The charge circuit 39 is connected to the charge pump 38. The charge circuit 39 is connected to the first drive circuit 32a through a first check valve 41. The charge circuit 39 is connected to the second drive circuit 32b through a second check valve 42.

The charge circuit 39 is connected to the first drive circuit 32a through a first relief valve 43. The first relief valve 43 is opened when the hydraulic pressure of the first drive circuit 32a becomes larger than a predetermined relief pressure. The charge circuit 39 is connected to the second drive circuit 32b through a second relief valve 44. The second relief valve 44 is opened when the hydraulic pressure of the second drive circuit 32b becomes larger than the predetermined relief pressure.

The charge circuit 39 is provided with a charge relief valve 40. The charge relief valve 40 is opened when the hydraulic pressure of the charge circuit 39 becomes larger than the predetermined relief pressure. Thereby, the hydraulic pressure of the charge circuit 39 is limited so as not to exceed the predetermined relief pressure.

A pump displacement control device 45 is connected to the travel pump 31. The pump displacement control device 45 controls the displacement of the travel pump 31. The displacement of the a hydraulic pump means the discharged amount (cc/rev) of hydraulic fluid per rotation. The pump displacement control device 45 controls the discharge direction of the travel pump 31. The pump displacement control device 45 includes a pump control cylinder 46 and a pump control valve 47.

The pump control cylinder 46 is connected to the travel pump 31. The pump control cylinder 46 is hydraulically driven to change the tilt angle of the travel pump 31. As a result, the pump control cylinder 46 changes the displacement of the travel pump 31. The pump control cylinder 46 is connected to the charge circuit 39 through a pump pilot circuit 48.

The pump control valve 47 is an electromagnetic proportional control valve controlled based on a command signal input to the pump control valve 47. The pump control valve 47 changes the supply direction of the hydraulic fluid to the pump control cylinder 46. The pump control valve 47 switches the direction in which the hydraulic fluid is supplied to the pump control cylinder 46, thereby switching the discharge direction of the travel pump 31. Thereby, the driving direction of the travel motor 33 is changed, and the forward movement and the reverse movement of the work vehicle 1 are switched.

The pump control valve 47 controls the pressure of the hydraulic fluid supplied to the pump control cylinder 46 through the pump pilot circuit 48. Specifically, the pump control valve 47 adjusts the tilt angle of the travel pump 31 by changing the pump pilot pressure supplied to the pump control cylinder 46. Thereby, the displacement of the travel pump 31 is controlled.

The pump pilot circuit 48 is connected to a hydraulic fluid tank through a relief valve 52. The pilot port of the relief valve 52 is connected to the first drive circuit 32a and the second drive circuit 32b through a shuttle valve 53. The shuttle valve 53 introduces the larger of the hydraulic pressure of the first drive circuit 32a and the hydraulic pressure of the second drive circuit 32b (hereinafter referred to as "drive circuit pressure") to the pilot port of the relief valve 52.

The relief valve 52 communicates the pump pilot circuit 48 to the hydraulic fluid tank when the drive circuit pressure becomes equal to or higher than a predetermined cutoff pressure. As a result, the hydraulic pressure of the pump pilot circuit 48 decreases, thereby reducing the displacement of the travel pump 31. As a result, an increase in the drive circuit pressure is suppressed.

Figure 3:
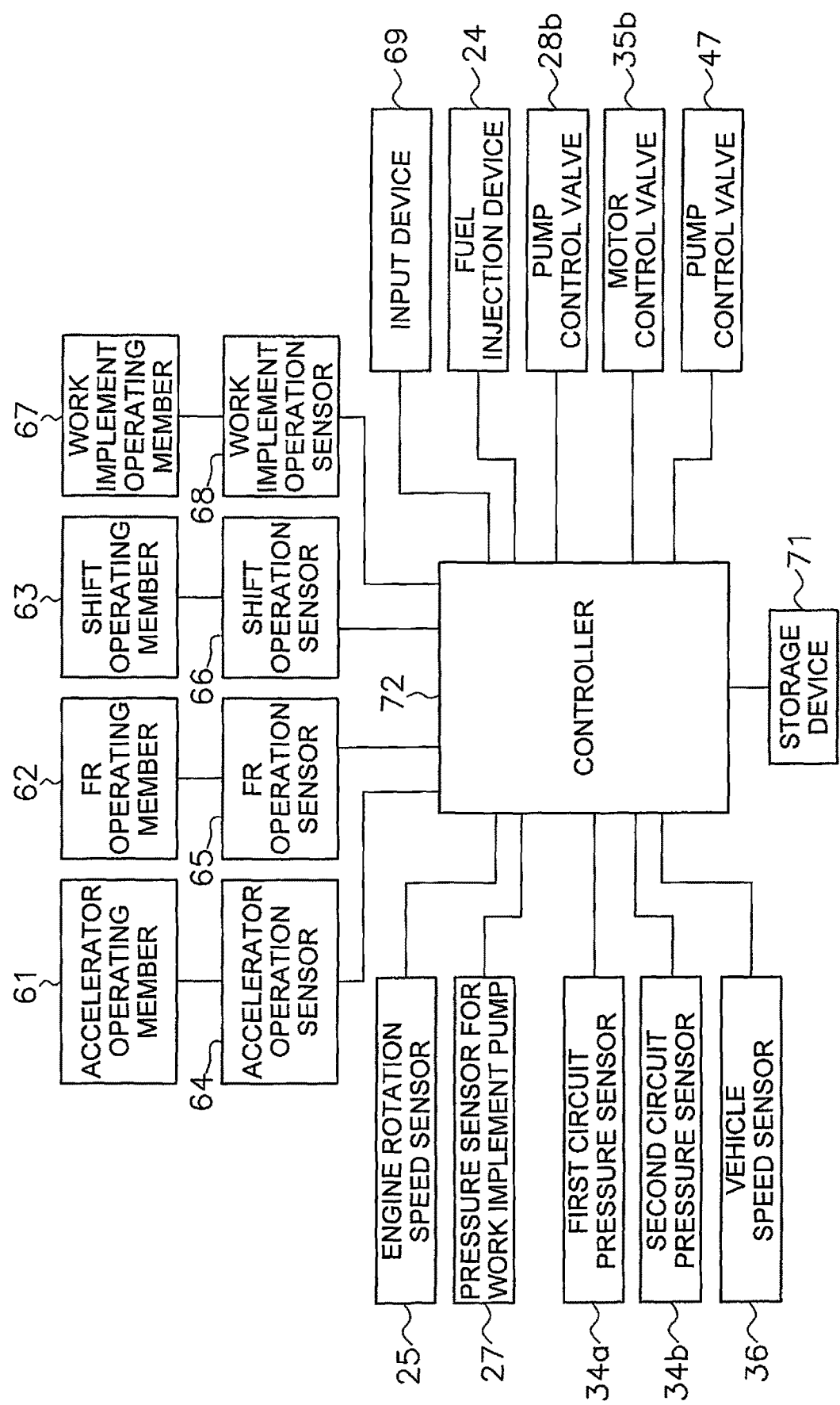
FIG. 3 is a block diagram showing a configuration of a control system of the work vehicle.

FIG. 3 is a schematic diagram showing a control system of the work vehicle 1. As shown in FIG. 3, the work vehicle 1 includes an accelerator operating member 61, an FR operating member 62 and a shift operating member 63. The accelerator operating member 61, the FR operating member 62, and the shift operating member 63 are disposed to be operable by an operator. The accelerator operating member 61, the FR operating member 62, and the shift operating member 63 are disposed in the cab 5.

The accelerator operating member 61 is an accelerator pedal, for example. However, the accelerator operating member 61 may be another member such as a lever or a switch. The accelerator operating member 61 is connected to an accelerator operation sensor 64. The accelerator operation sensor 64 is a position sensor to detect the position of the accelerator operating member 61, for example. The accelerator operation sensor 64 outputs a signal indicative of the operation amount of the accelerator operating member 61 (hereinafter referred to as "accelerator operation amount"). The accelerator operation amount is represented by, for example, a ratio when a state in which the accelerator operating member 61 is operated in a fully opened state is 100%. As will be described later, the operator can adjust the engine rotation speed by adjusting the accelerator operation amount.

The FR operating member 62 is an FR lever, for example. However, the FR operating member 62 may be another member, such as a switch. The FR operating member 62 is switched to the forward position, the reverse position, and the neutral position. The FR operating member 62 is connected to an FR operation sensor 65. The FR operation sensor 65 is a position sensor to detect the position of the FR operating member 62, for example. The FR operation sensor 65 outputs a signal indicative of the position of the FR operating member 62. By operating the FR operating member 62, the operator can switch between the forward movement and the reverse movement of the work vehicle 1.

The shift operating member 63 is, for example, a dial type switch. However, the shift operating member 63 may be another member, such as a lever. The shift operating member 63 is connected to a shift operation sensor 66. The shift operation sensor 66 is, for example, a position sensor to detect the position of the shift operating member 63 (hereinafter referred to as "shift position"). The shift operation sensor 66 outputs a signal indicative of the shift position. The shift position includes, for example, the positions of the first speed to the fourth speed. However, the shift position may include a position higher than the fourth speed. Alternatively, the shift position may be from the first speed to a position lower than the fourth speed.

Figure 4:
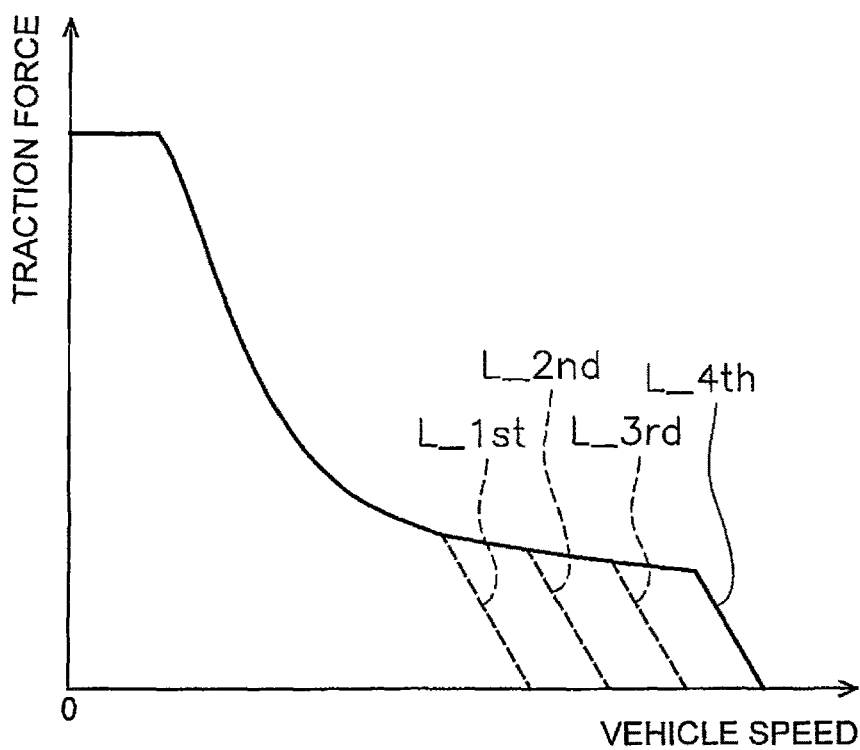
FIG. 4 is a graph showing vehicle speed-traction force characteristics of the work vehicle.

FIG. 4 is a graph showing vehicle speed-traction force characteristics of the work vehicle 1. As shown in FIG. 4, the operator can select a shift pattern (L_1st to L_4th) defining the maximum vehicle speed by operating the shift operating member 63.

The work vehicle 1 includes a work implement operating member 67. The work implement operating member 67 is, for example, a work implement lever. However, the work implement operating member 67 may be another member such as a switch. The pilot pressure corresponding to the operation of the work implement operating member 67 is applied to the work implement control valve 30. The work implement operating member 67 is connected to a work implement operation sensor 68. The work implement operation sensor 68 is, for example, a pressure sensor. The work implement operation sensor 68 detects an operation amount (hereinafter referred to as "work implement operation amount") and an operation direction of the work implement operating member 67, and outputs a signal indicative of the work implement operation amount and the operation direction. When the work implement control valve 30 is not a pressure proportional control valve but an electromagnetic proportional control valve, the work implement operation sensor 68 may be a position sensor that electrically detects the position of the work implement operating member 67. The operator can operate the work implement 3 by operating the work implement operating member 67. For example, the operator can raise or lower the bucket 12 by operating the work implement operating member 67.

The work vehicle 1 comprises an input device 69. The input device 69 is a touch panel, for example. However, the input device 69 is not limited to a touch panel, and may be another device such as a switch. By operating the input device 69, the operator can perform various settings of the work vehicle 1.

As shown in FIG. 3, the work vehicle 1 includes a storage device 71 and a controller 72. The storage device 71 includes a memory and an auxiliary storage device, for example. The storage device 71 may be, for example, a RAM, a ROM, or the like. The storage device 71 may be a semiconductor memory, a hard disk, or the like. The storage device 71 is an exemplary non-transitory computer-readable recording medium. The storage device 71 stores computer instructions executable by a processor for controlling the work vehicle 1.

The controller 72 includes, for example, a processor such as a CPU. The controller 72 is communicably connected to the sensor, the input device 69, and the storage device 71 described above. The controller 72 is connected to the above-mentioned various sensors, the input device 69, and the storage device 71 so as to be able to communicate with each other by wired or wireless communication. The controller 72 acquires various types of data by receiving signals from the sensors, the input device 69, and the storage device 71. The controller 72 is programmed to control the work vehicle 1 based on the acquired data. The controller 72 may be configured by a plurality of controllers that are separate from each other.

The controller 72 is connected to the control valves 35b and 47 and the fuel injection device 24 so as to be able to communicate with each other by wire or wireless. The controller 72 outputs command signals to the control valves 35b and 47 and the fuel injection device 24, thereby controlling the control valves 35b and 47 and the fuel injection device 24.

More specifically, the controller 72 controls the engine torque and the engine rotation speed by outputting a command signal to the fuel injection device 24. The controller 72 outputs a command signal to the motor control valve 35b, thereby controlling the displacement of the travel motor 33. The controller 72 outputs a command signal to the pump control valve 47, thereby controlling the displacement of the travel pump 31. The controller 72 controls the displacement of the travel pump and the displacement of the travel motor to control the transmission ratio of the HST 23 so that the vehicle speed-traction force characteristics as shown in FIGS. 4 and 5 can be realized.

Figure 5:
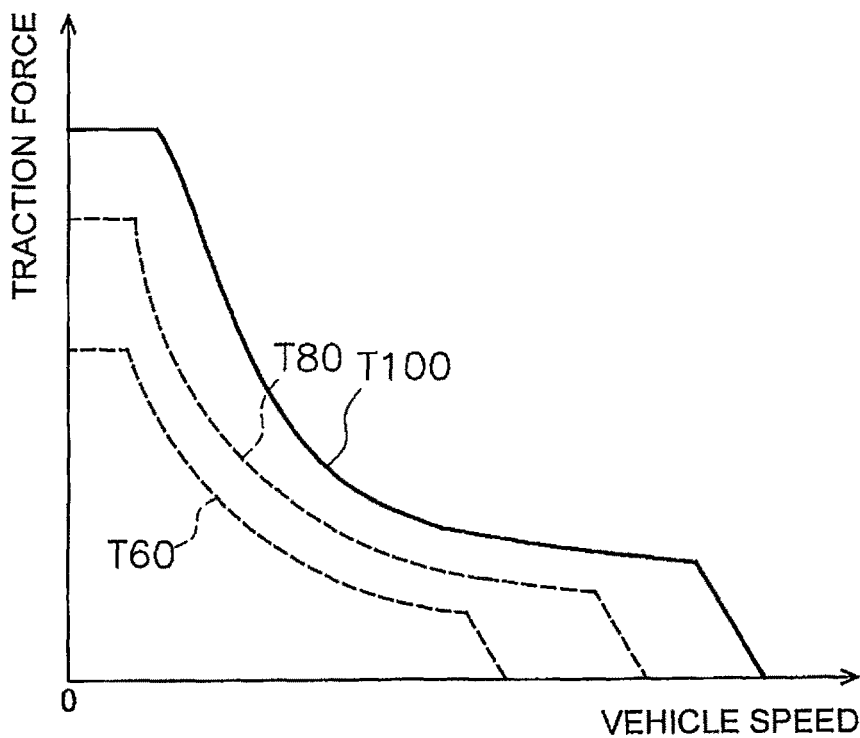
FIG. 5 is a diagram showing an example of vehicle speed-traction force characteristics that are changed according to an operation of an accelerator operating member.

FIG. 5 is a diagram showing an example of the vehicle speed-traction force characteristics which are changed in accordance with the operation of the accelerator operating member 61 by the operator. In FIG. 5, the T100 shows the vehicle speed-traction force characteristic when the accelerator operation amount is 100%. T80 represents the vehicle speed-traction force characteristic when the accelerator operation amount is 80%. T60 represents the vehicle speed-traction force characteristic when the accelerator operation amount is 60%.

Figure 6:
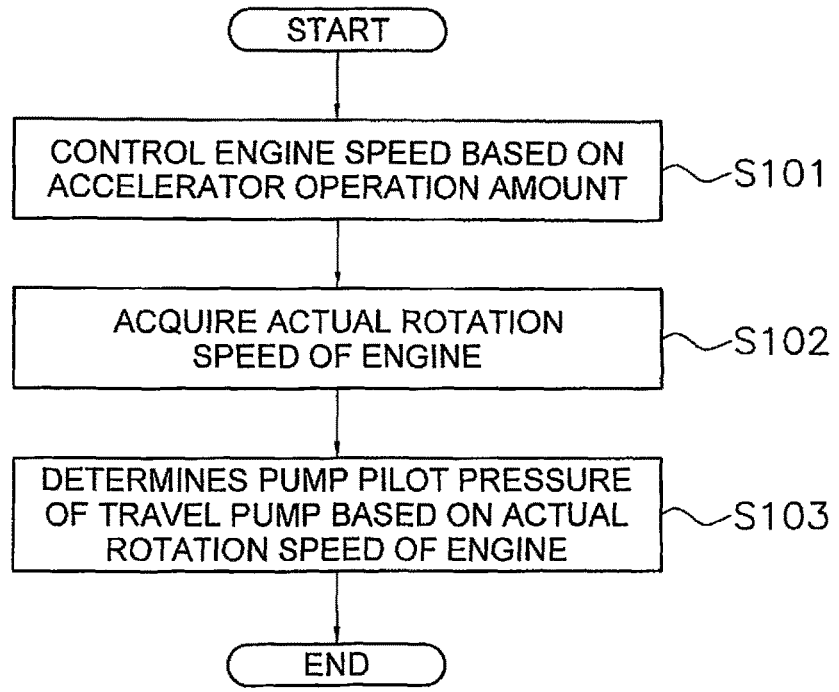
FIG. 6 is a flow chart illustrating processing performed by a controller.

Processing executed by the controller 72 will be described below. FIG. 6 is a flow chart showing the process performed by the controller 72 to control the travel pump 31. In the following description, control when the work vehicle 1 moves forward will be described. However, the same control may be performed also when the work vehicle 1 is backward traveling.

As shown in FIG. 6, in the S101, the controller 72 controls the engine speed based on the accelerator operation amount. Here, the controller 72 acquires the accelerator operation amount by the signal from the accelerator operation sensor 64. The controller 72 determines the target engine rotation speed according to the accelerator operation amount.

Figure 7:
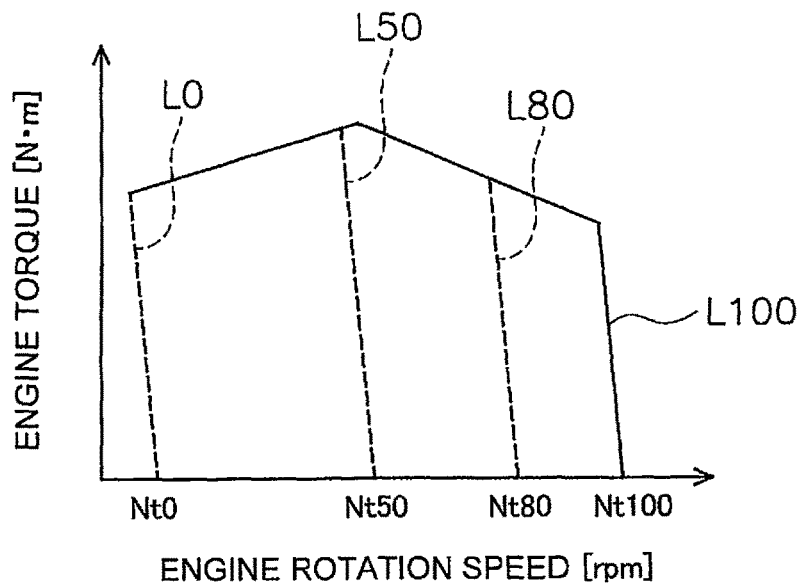
FIG. 7 is a graph showing engine torque vs. engine speed characteristics.

FIG. 7 is a graph showing engine torque characteristics defining a relationship between the engine torque and the engine rotation speed. In FIG. 7, the Nt100, Nt80, Nt50, Nt0 indicates the target engine speed when the accelerator operation amount is 100%, 80%, 50%, and 0%, respectively. The target engine rotation speed Nt100, Nt80, Nt50, Nt0 indicates the engine rotation speed at no load. The controller 72 controls the fuel injection device 24 in accordance with the accelerator operation amount and the load in an all-speed governor method. More specifically, the controller 72 outputs a command signal to the fuel injection device 24 so that the engine rotation speed becomes a value in accordance with the load on the regulation line corresponding to the accelerator operation amount. In FIG. 7, L100, L80, L50, and L0 represent the regulation lines when the accelerator operating amounts are 100%, 80%, 50%, and 0%, respectively. When the accelerator operation amount is 0%, it means that the accelerator operating member is not operated in the off state.

In step S102, the controller 72 acquires the actual rotation speed of the engine 21. The controller 72 acquires the actual rotation speed of the engine 21 by the signal from the engine rotation speed sensor 25.

Figure 9A:
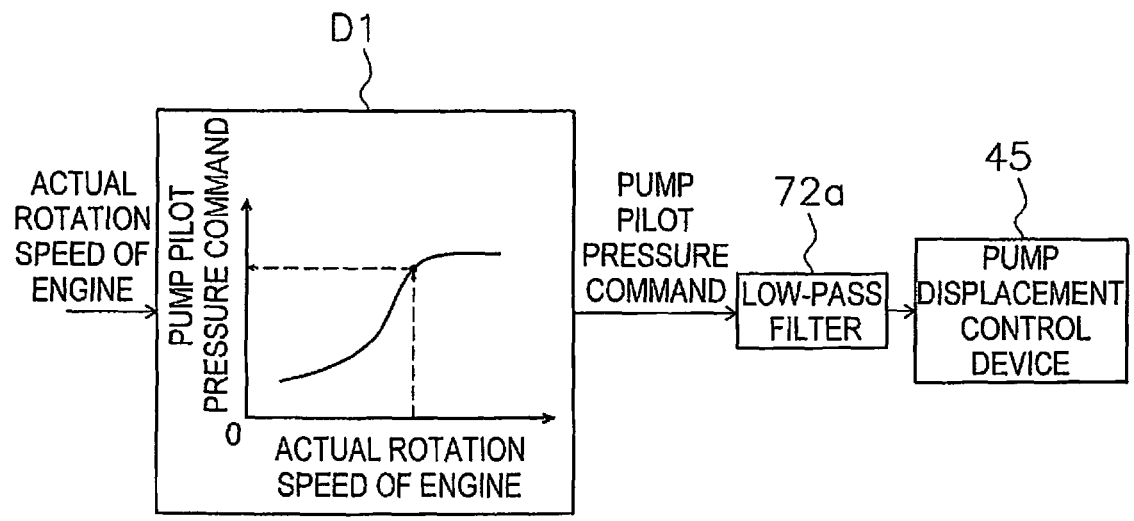
FIG. 9A and FIG. 9B are diagrams showing processing for controlling a travel pump and a travel motor.

In step S103, the controller 72 determines the pump pilot pressure of the travel pump 31 based on the actual rotation speed of the engine 21. More specifically, as shown in FIG. 9A, the pump pilot pressure is determined from the actual rotation speed of the engine 21 by referring to the pump pilot pressure characteristic D1. The pump pilot pressure characteristic D1 defines a pump pilot pressure with respect to an actual rotation speed of the engine 21. The controller 72 has a low-pass filter 72a. The controller 72 outputs a command signal indicative of the pump pilot pressure to the pump displacement control device 45 through the low-pass filter 72a.

Figure 8:
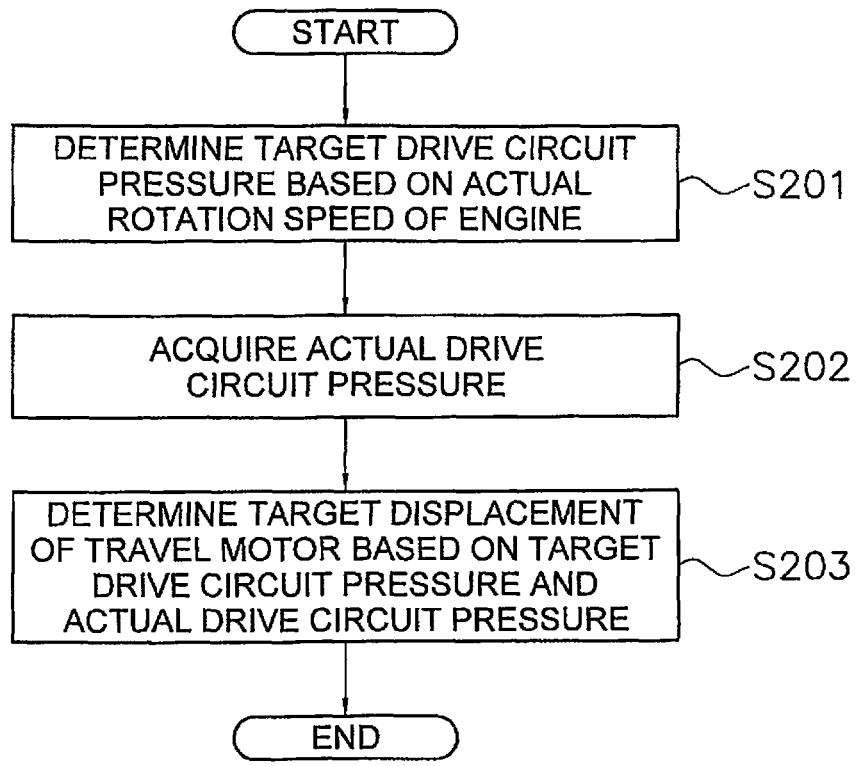
FIG. 8 is a flow chart showing processing performed by the controller.
Figure 9B:
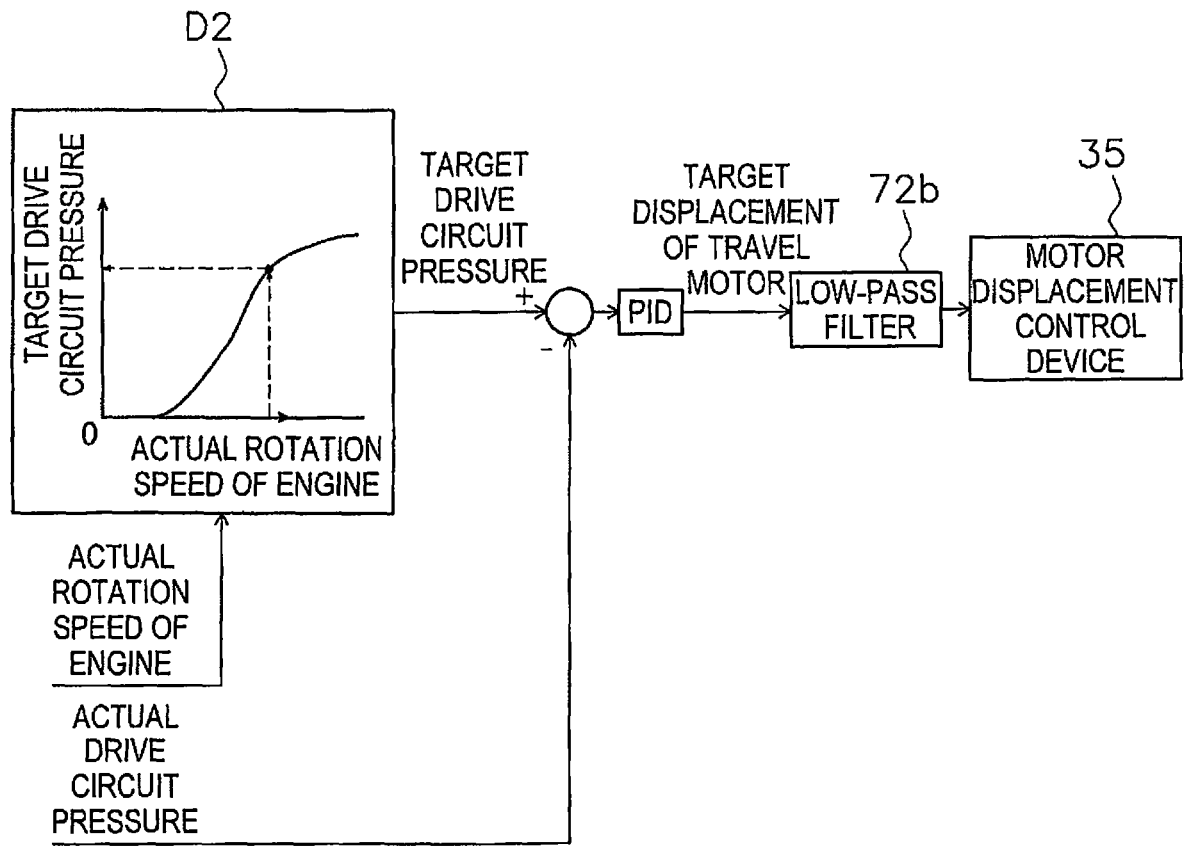

FIG. 8 is a flowchart showing processing executed by the controller 72 to control the travel motor 33. As shown in FIG. 8, in step S201, the controller 72 determines the target drive circuit pressure based on the actual rotation speed of the engine 21. More specifically, as shown in the FIG. 9B, the controller 72 determines the target drive circuit pressure from the actual rotation speed of the engine 21 by referring to the drive circuit pressure characteristic D2. The drive circuit pressure characteristic D2 defines a target drive circuit pressure with respect to an actual rotation speed of the engine 21.

In step S202, the controller 72 acquires the actual drive circuit pressure. The controller 72 acquires the actual drive circuit pressure by the signal from the drive circuit pressure sensor 34. In step S203, the controller 72 determines the target displacement of the travel motor 33 based on the target drive circuit pressure and the actual drive circuit pressure. More specifically, as shown in the FIG. 9B, the controller 72 determines the target displacement of the travel motor 33 by PID-control based on the difference between the target drive circuit pressure and the actual drive circuit pressure so that the actual drive circuit pressure approaches the target drive circuit pressure.

The controller 72 has a low-pass filter 72b. The controller 72 outputs a command signal indicative of the target displacement of the travel motor 33 to the motor displacement control device 35 through the low-pass filter 72b.

In this embodiment, the controller 72 determines whether the work vehicle 1 is in coasting deceleration, when the work vehicle 1 is in the coasting deceleration, the controller 72 controls the HST 23 to reduce the brake torque by the HST 23 (hereinafter, HST brake torque) in response to the deviation between the actual rotation speed and the target rotation speed of the engine 21. Hereinafter, the control according to the first embodiment for suppressing the HST braking torque will be described.

Figure 10:
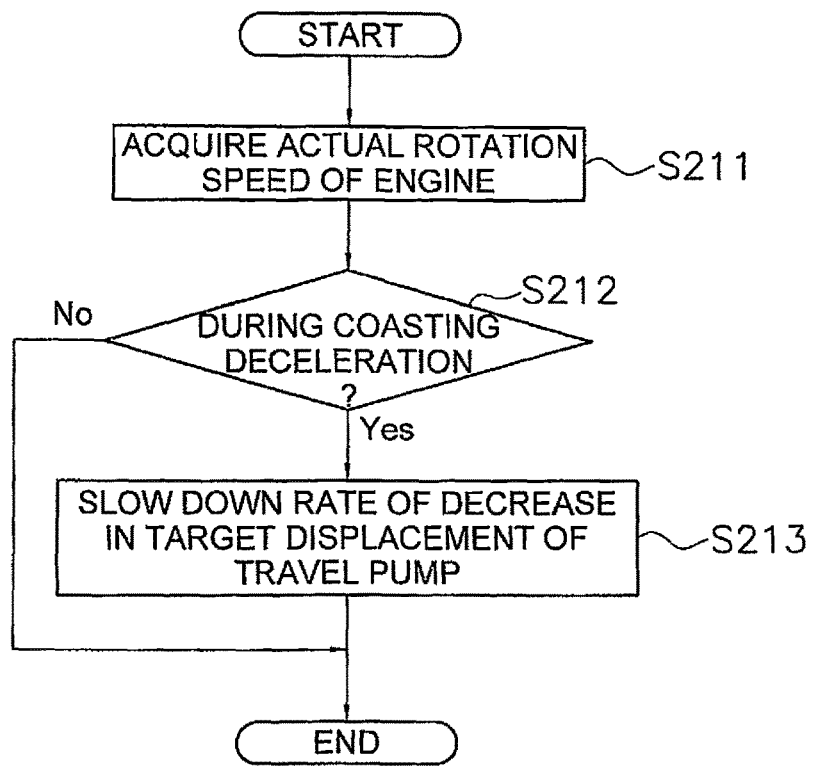
FIG. 10 is a flowchart showing processing of a control according to a first embodiment.

FIG. 10 is a flowchart showing processing executed by the controller 72 in the first embodiment.

In step S211, the controller 72 acquires the actual rotation speed of the engine 21. In step S212, the controller 72 determines whether the work vehicle 1 is in the coasting deceleration. The controller 72 determines that the work vehicle 1 is in the coasting deceleration when a determination condition represented by the following equation (1) is satisfied.

$$Na > Nt + b1 \tag{1}$$

"Na" is an actual rotation speed of the engine 21. "Nt" is the target engine speed described above. "b1" is a predetermined constant, and is set for hysteresis, for example. The above determination condition indicates that the actual rotation speed of the engine 21 exceeds the engine rotation speed at no load. When the controller 72 determines that the work vehicle 1 is in the coasting deceleration, the process proceeds to S213.

In step S213, the controller 72 slows down the rate of decrease in the command value of the target displacement of the travel pump 31. During the coasting deceleration, in detail, the controller 72 decreases the rate of decrease in the command value of the target displacement of the travel pump 31 by making the cut-off frequency of the low-pass filter 72a smaller than that at the normal state.

Figure 11:
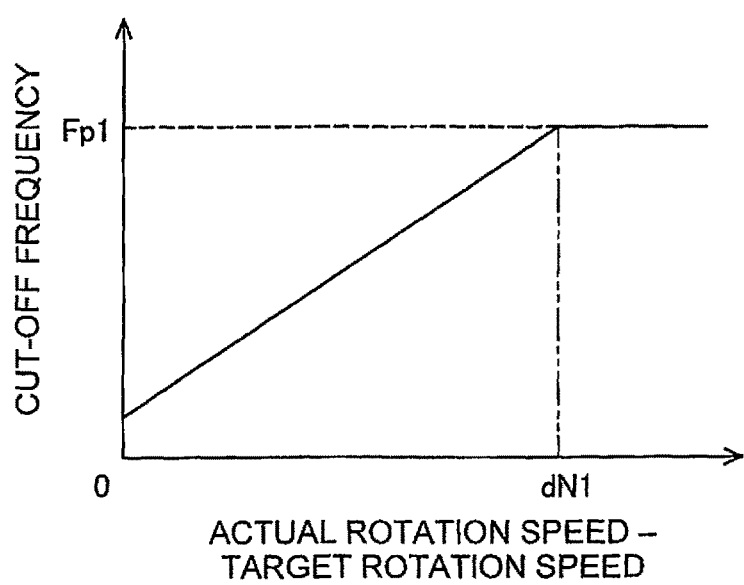
FIG. 11 is a diagram showing processing according to the first embodiment.

In FIG. 11, the solid line shows the relationship between the deviation between the actual rotation speed of the engine 21 and the target rotation speed and the cut-off frequency of the low-pass filter 72a during the coasting deceleration. In FIG. 11, the broken line indicates the cut-off frequency in the normal state. As shown in FIG. 11, the controller 72 reduces the cut-off frequency of the low-pass filter 72a in accordance with the deviation between the actual rotation speed of the engine 21 and the target rotation speed. Normally, the cut-off frequency is constant at the value Fp1. On the other hand, the cut-off frequency during the coasting deceleration is constant at the value Fp1 when the deviation is equal to or more than the predetermined value dN1, but when the deviation is smaller than the predetermined value dN1, the cut-off frequency becomes smaller in accordance with the reduction of the deviation.

When a release condition represented by the following equation (2) is satisfied, the controller 72 ends the control during the coasting deceleration described above and returns to the control in the normal state.

$$Na < Nt - b2 \tag{2}$$

"b2" is a predetermined constant and is set for hysteresis, for example. The above determination condition indicates that the actual rotation speed of the engine 21 is lower than the engine rotation speed at no load.

In the control according to the first embodiment described above, the controller 72 reduces the cut-off frequency of the low-pass filter 72a during the coasting deceleration, compared to the normal state. As a result, the differential pressure between the first drive circuit 32a and the second drive circuit 32b (hereinafter referred to as "HST differential pressure") is reduced. The smaller the HST differential pressure, the smaller the HST braking torque becomes. Therefore, by reducing the HST differential pressure during the coasting deceleration, the HST braking torque can be kept small.

Further, during the coasting deceleration, the controller 72 decreases the cut-off frequency of the low-pass filter 72a as the deviation between the actual rotation speed of the engine 21 and the target rotation speed becomes smaller. Therefore, the cut-off frequency of the low-pass filter 72a becomes smaller as the actual rotation speed of the engine 21 decreases due to the coasting deceleration and approaches the target rotation speed. Therefore, the closer to the end of the coasting deceleration, the smaller the HST braking torque becomes. Thus, the sense of deceleration at the end of the coasting deceleration can be relaxed.

As described above, in the present embodiment, a gentle coasting deceleration can be easily performed. In addition, since the chances of the work vehicle 1 traveling in the state where the accelerator operating member 61 is turned off are increased, fuel efficiency can be improved.

Figure 12:
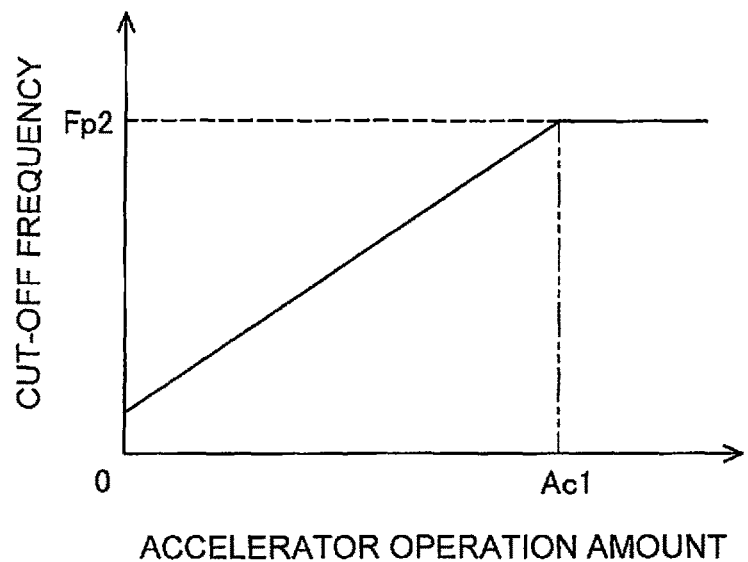
FIG. 12 is a diagram showing processing according to a modification of the first embodiment.

When the work vehicle 1 is in the coasting deceleration, the controller 72 may decrease the rate of decrease in the target displacement of the travel pump 31 in accordance with the accelerator operation amount in the above-described S213. FIG. 12 is a diagram showing processing according to a modification of the first embodiment. In FIG. 12, the solid line shows the relationship between the accelerator operation amount and the cut-off frequency of the low-pass filter 72a during the coasting deceleration. In FIG. 12, the broken line indicates the cut-off frequency in the normal state. As shown in FIG. 12, the cut-off frequency during the normal state is constant at the value Fp2. On the other hand, the cut-off frequency during the coasting deceleration is constant at the value Fp2 when the accelerator operation amount is equal to or more than the value Ac1, but when the accelerator operation amount is smaller than the predetermined value AC1, the cut-off frequency becomes smaller in accordance with the reduction of the accelerator operation amount.

In the control according to the modification of the first embodiment described above, the controller 72 reduces the cut-off frequency of the low-pass filter 72a in the coasting deceleration compared to the normal state. As a result, the HST differential pressure is reduced during the coasting deceleration, whereby the HST braking torque can be suppressed to a small value.

In addition, the controller 72 decreases the cut-off frequency of the low-pass filter 72a as the accelerator operation amount becomes smaller during the coasting deceleration. Therefore, when the accelerator operating member 61 is turned off, the HST braking torque can be suppressed to a small value. Accordingly, it is possible to loosen the sense of deceleration when the accelerator operating member 61 is turned off.

Figure 13:
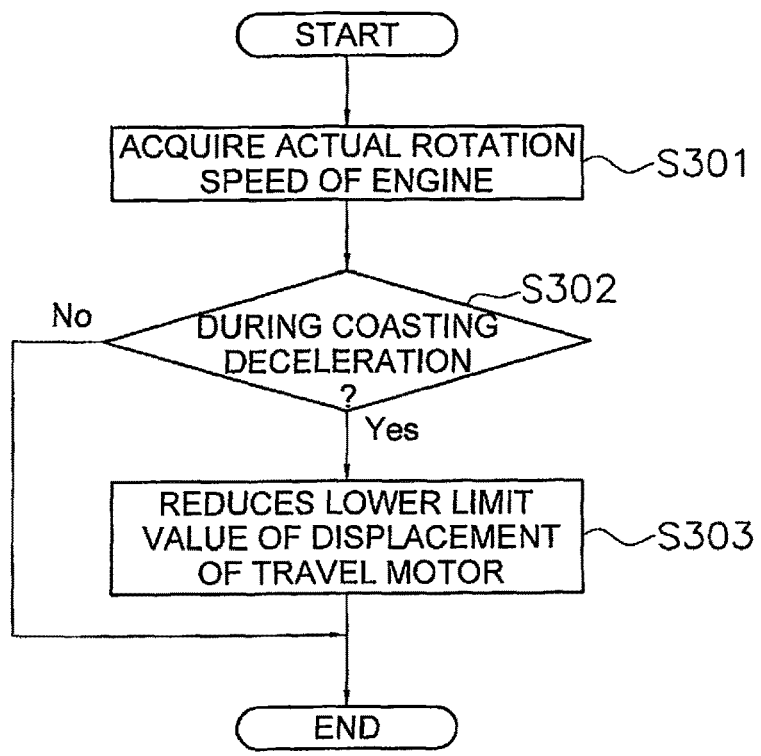
FIG. 13 is a flowchart showing processing of a control according to a second embodiment.

Next, control according to the second embodiment for suppressing HST braking torque will be described. FIG. 13 is a flowchart showing processing executed by the controller 72 in the second embodiment. Steps S301 and S302 are similar to steps S211 and S212 described above.

Figure 14:
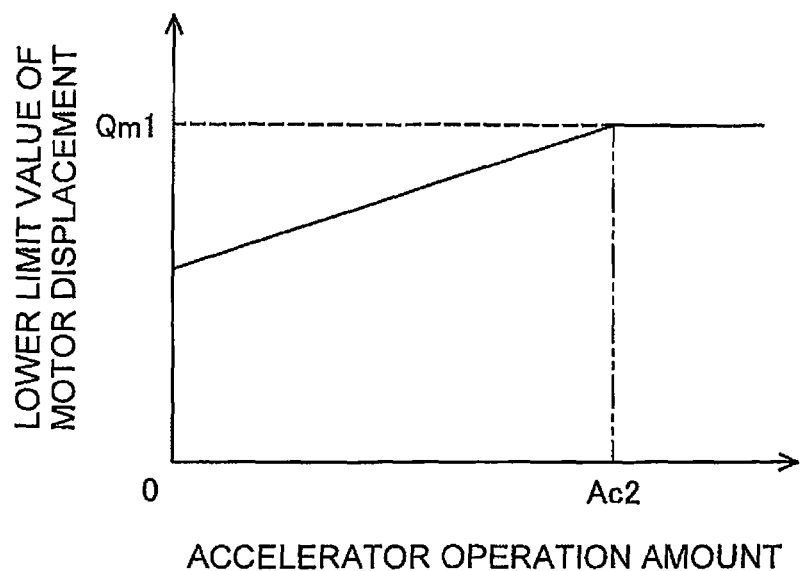
FIG. 14 is a diagram showing processing according to the second embodiment.

In step S303, the controller 72 reduces the lower limit value of the displacement of the travel motor 33 (hereinafter referred to as the "lower limit value of the motor displacement") from the normal state. In FIG. 14, the solid line shows the relationship between the accelerator operation amount and the lower limit value of the motor displacement during the coasting deceleration. In FIG. 14, a broken line indicates the lower limit value of the motor displacement in the normal state. As shown in FIG. 14, the controller 72 reduces the lower limit value of the motor displacement according to the accelerator operation amount. The lower limit value of the motor displacement in the normal state is constant at a value Qm1 corresponding to the shift position. On the other hand, the lower limit value of the motor displacement during the coasting deceleration is constant at the value Qm1 when the accelerator operation amount is equal to or more than the predetermined value Ac2, but is reduced in accordance with the reduction of the accelerator operation amount when the accelerator operation amount is smaller than the predetermined value Ac2.

In the control according to the second embodiment described above, the controller 72 reduces the lower limit value of the motor displacement during the coasting deceleration compared to the normal state. The smaller the motor displacement, the smaller the HST braking torque becomes. Therefore, during the coasting deceleration, the lower limit value of the motor displacement is reduced, and the motor displacement is reduced following the reduction of the lower limit value, thereby making it possible to suppress the HST braking torque to be small.

In addition, the controller 72 decreases the lower limit value of the motor displacement as the accelerator operation amount becomes smaller. Therefore, when the accelerator operating member 61 is turned off, the HST braking torque can be suppressed to a small value. Accordingly, it is possible to loosen the sense of deceleration when the accelerator operating member 61 is turned off.

Figure 15:
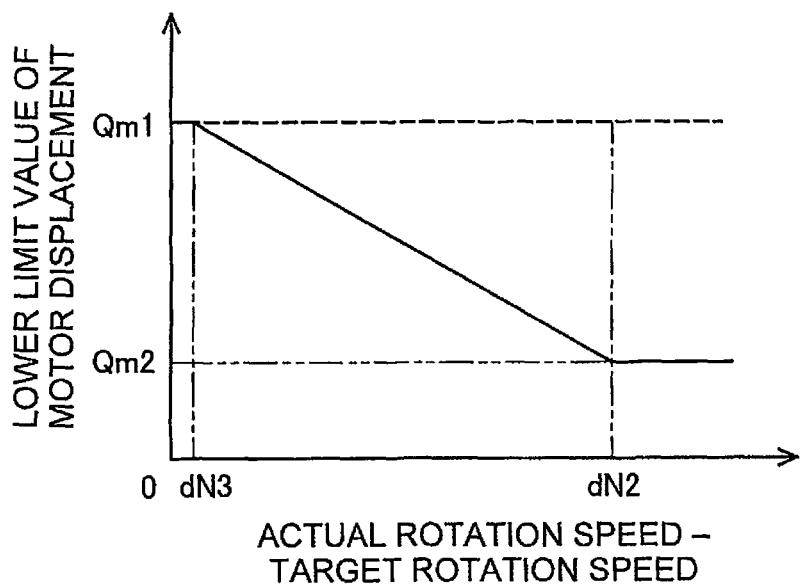
FIG. 15 is a diagram showing processing according to a modification of the second embodiment.

When the vehicle is in the coasting deceleration, the controller 72 may increase the lower limit of the motor displacement in accordance with the deviation between the actual rotation speed of the engine 21 and the target rotation speed in the above-described step S303. FIG. 15 is a diagram showing processing according to a modification of the second embodiment. In FIG. 15, the solid line indicates the relationship between the deviation between the actual rotation speed of the engine 21 and the target rotation speed and the lower limit value of the motor displacement during the coasting deceleration. In FIG. 15, a broken line indicates the lower limit value of the motor displacement in the normal state.

As shown in FIG. 15, during the coasting deceleration, the controller 72 makes the lower limit value of the motor displacement smaller than that during the normal state. Further, the controller 72 increases the lower limit value of the motor displacement in accordance with the decrease of the deviation between the actual rotation speed of the engine 21 and the target rotation speed. The lower limit value of the motor displacement in the normal state is constant at a value Qm1 corresponding to the shift position. On the other hand, the lower limit value of the motor displacement during the coasting deceleration is constant at a value Qm2 smaller than the value Qm1 when the deviation is equal to or larger than the predetermined value dN2. Further, when the deviation is smaller than the predetermined value dN2, the lower limit value of the motor displacement during the coasting deceleration increases in accordance with the reduction of the deviation, and returns to the value Qm1 during the normal state when the deviation is equal to or less than the predetermined value dN3 smaller than the predetermined value dN2. The predetermined value dN3 may be 0.

In the control according to the modified example of the second embodiment described above, the controller 72 reduces the lower limit value of the motor displacement during the coasting deceleration compared to the normal state. As a result, the HST braking torque can be suppressed to a small value during the coasting deceleration.

Further, during the coasting deceleration, the controller 72 increases the lower limit value of the motor displacement as the deviation between the actual rotation speed of the engine 21 and the target rotation speed becomes smaller. When the control during the coasting deceleration is finished and the control returns to the control during the normal state, the displacement of the travel motor 33 can be smoothly changed.

Figure 16:
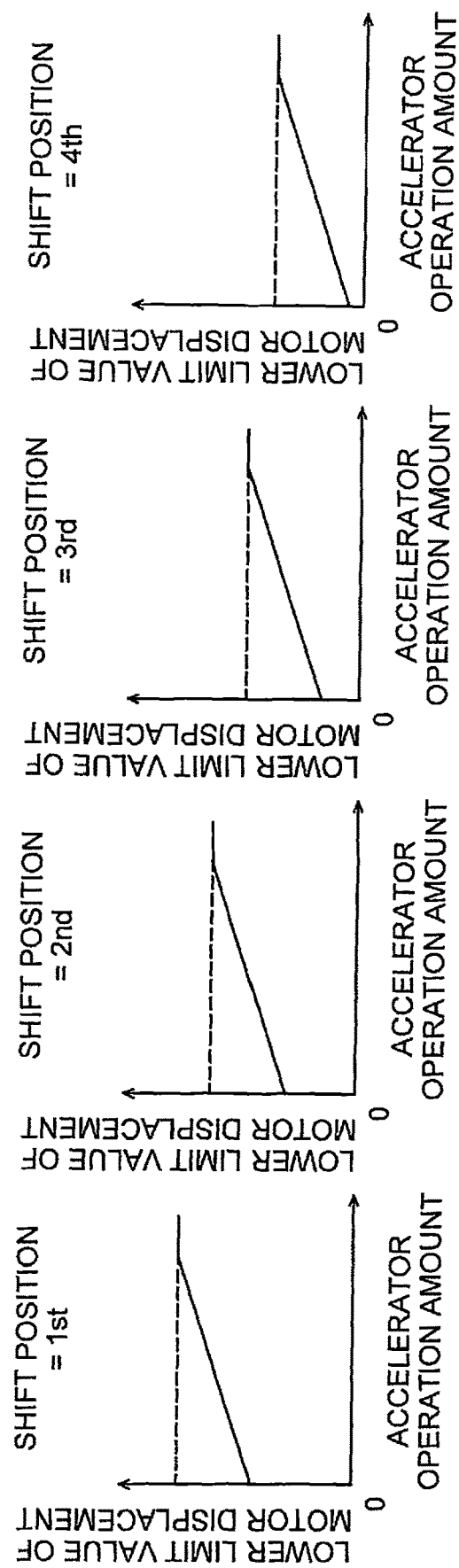
FIG. 16 is a diagram showing processing according to a modification of the second embodiment.

The relationship between the accelerator operation amount and the lower limit value of the motor displacement, and the relationship between the deviation between the actual rotation speed of the engine 21 and the target rotation speed and the lower limit value of the motor displacement may be set for each shift position. For example, FIG. 16 shows the relationship between the accelerator operation amount and the lower limit value of the motor displacement for each shift position. As shown in FIG. 16, the controller 72 may reduce the lower limit value of the motor displacement during the coasting deceleration as the shift position becomes higher. Alternatively, the controller 72 may reduce the lower limit value of the motor displacement during the coasting deceleration smaller than during the normal state only in a part of the plurality of shift positions.

When the control is switched from the control in the normal state to the control during the coasting deceleration described above, the controller 72 may modulate and change the lower limit value of the motor displacement. Further, when the control is switched from the control during the coasting deceleration to the control in the normal state, the controller 72 may modulate and change the lower limit value of the motor displacement.

Figure 17:
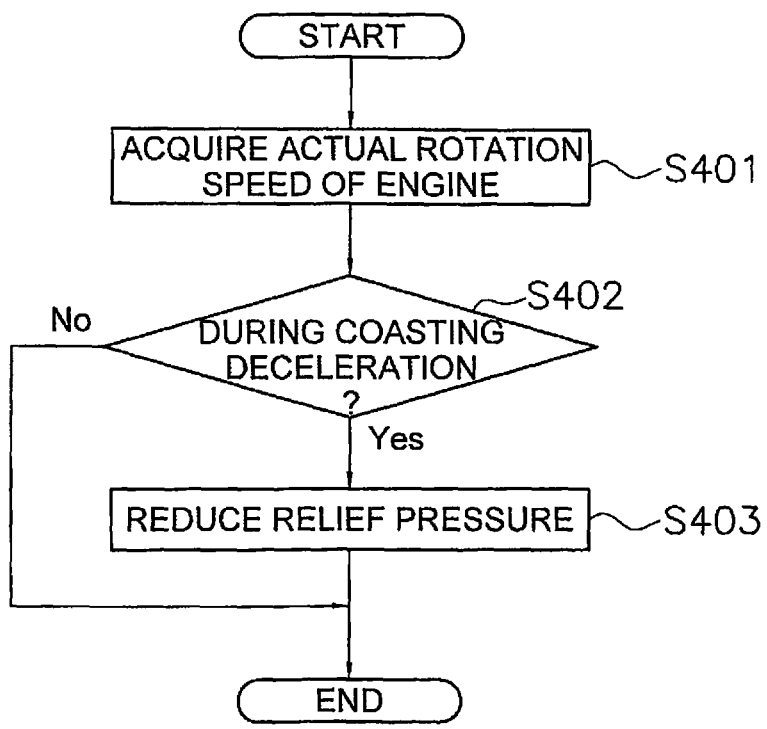
FIG. 17 is a flowchart showing processing of a control according to a third embodiment.
Figure 18:
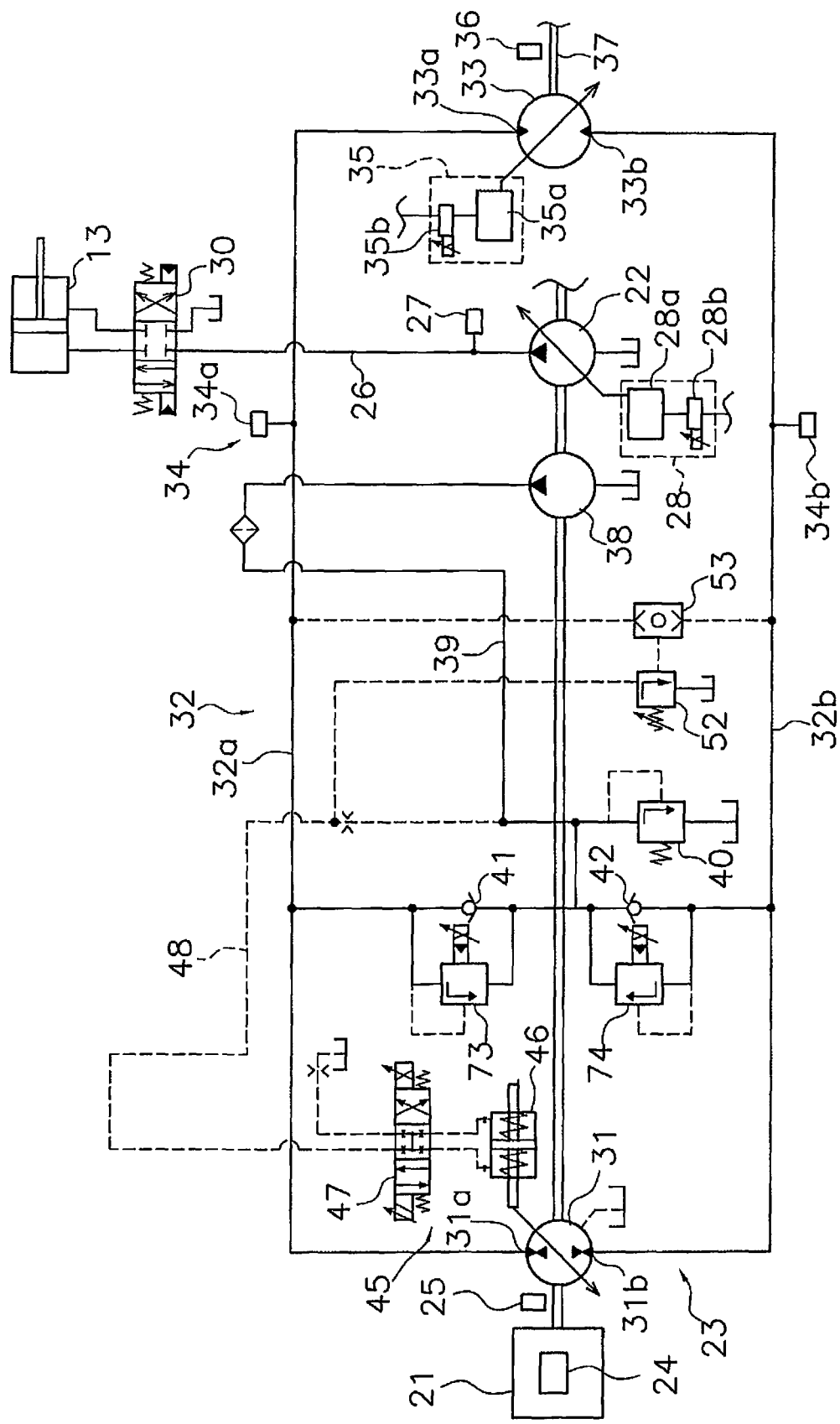
FIG. 18 is a block diagram showing the configuration of the drive system of the work vehicle according to the third embodiment.
Figure 19:
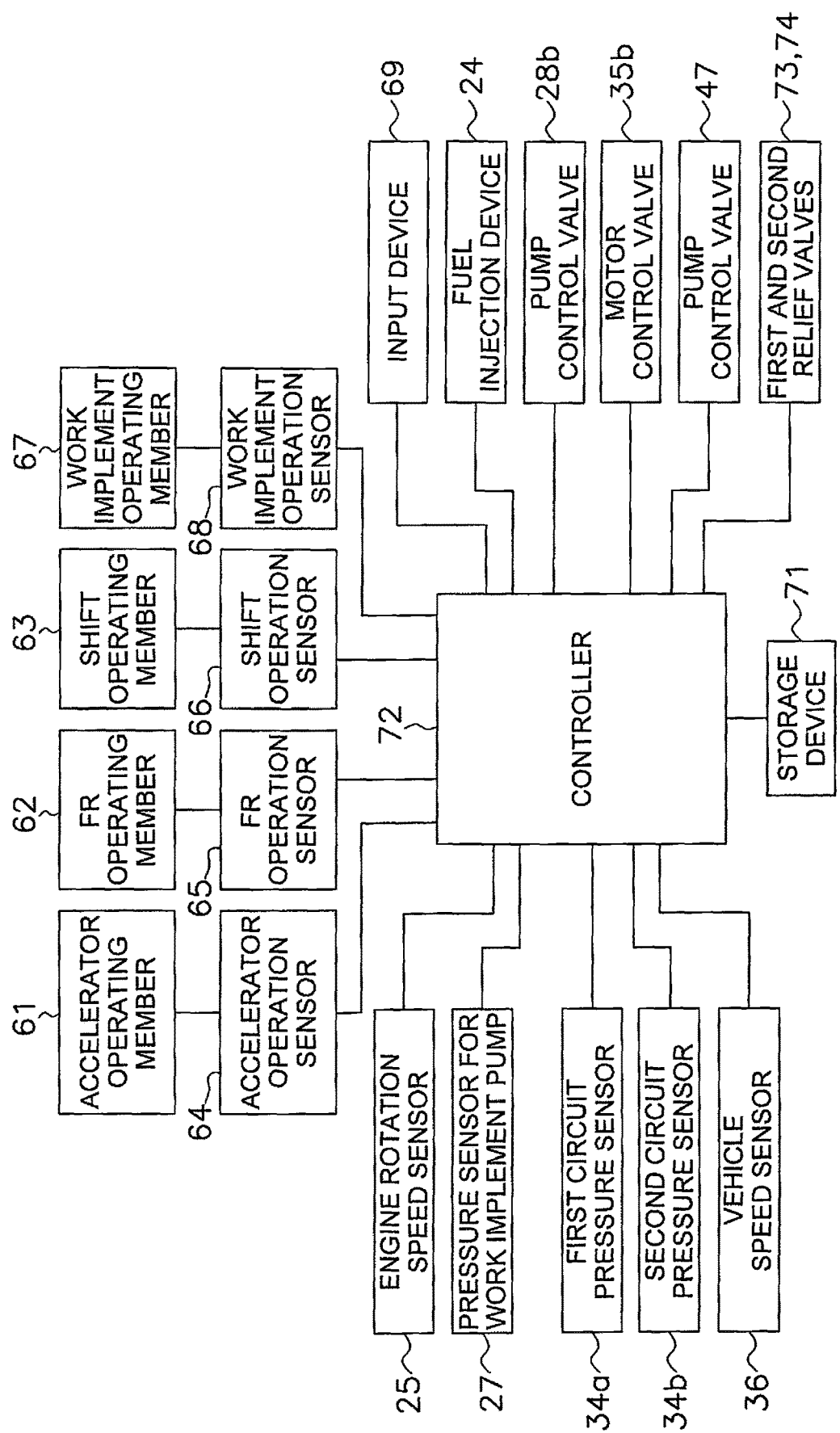
FIG. 19 is a block diagram showing the configuration of the control system of the work vehicle according to the third embodiment.

Next, a control according to the third embodiment for suppressing HST braking torque will be described. FIG. 17 is a flow chart showing processing executed by the controller 72 in the third embodiment. FIG. 18 is a block diagram showing a configuration of a drive system of the work vehicle 1 according to the third embodiment. FIG. 19 is a block diagram illustrating a configuration of a control system of the work vehicle 1 according to the third embodiment. In the work vehicle 1 according to the third embodiment, a first relief valve 73 and a second relief valve 74 are provided in place of the first relief valve 43 and the second relief valve 44 in the drive system of the work vehicle 1 of the first embodiment described above. The first relief valve 73 and the second relief valve 74 are electromagnetic proportional control valves that can variably control the relief pressure. The controller 72 is wired or wirelessly connected to the relief valves 73 and 74. The controller 72 variably controls the relief pressure by outputting a command signal to the relief valves 73 and 74.

Figure 20:
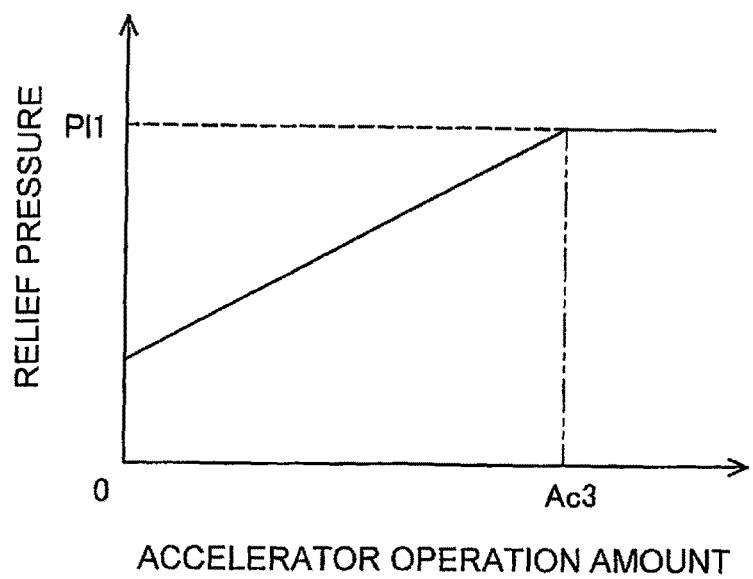
FIG. 20 is a diagram showing processing according to the third embodiment.

In FIG. 17, steps S401 and S402 are similar to steps S211 and S212 described above. In step S403, the controller 72 reduces the relief pressure of the relief valves 73 and 74 smaller than that in the normal state. In FIG. 20, the solid line shows the relationship between the accelerator operation amount and the relief pressures of the relief valves 73 and 74 during the coasting deceleration. In FIG. 20, the broken line indicates the relief pressures of the relief valves 73 and 74 in the normal state. As shown in FIG. 20, the controller 72 reduces the relief pressure according to the accelerator operation amount. The relief pressure during normal state is constant at a Pl1. On the other hand, the relief pressure during the coasting deceleration is constant at the value Pl1 when the accelerator operation amount is equal to or more than the predetermined value Ac3, but decreases in accordance with the reduction of the accelerator operation amount when the accelerator operation amount is smaller than the predetermined value Ac3.

In the control according to the third embodiment described above, the controller 72 reduces the relief pressure during the coasting deceleration compared to the normal state. The smaller the relief pressure, the smaller the HST differential pressure becomes, and therefore the HST braking torque becomes smaller. Therefore, the relief pressure is reduced during the coasting deceleration, whereby the HST braking torque can be suppressed to a small value.

Further, the controller 72 reduces the relief pressure as the accelerator operation amount becomes smaller. Therefore, when the accelerator operating member 61 is turned off, the HST braking torque can be suppressed to a small value. Accordingly, it is possible to loosen the sense of deceleration when the accelerator operating member 61 is turned off.

Figure 21:
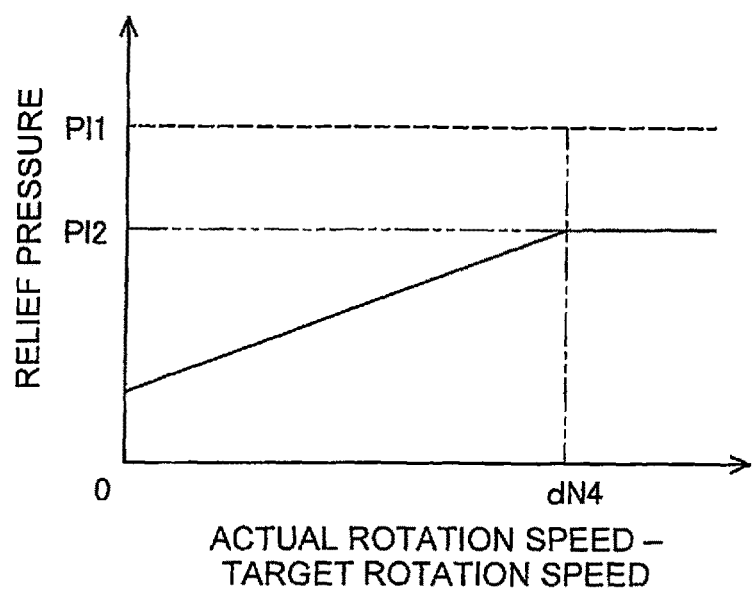
FIG. 21 is a diagram showing processing according to a modification of the third embodiment.

When the work vehicle 1 is in the coasting deceleration, the controller 72, in the step S403 described above, may reduce the relief pressure of the relief valves 73 and 74 in accordance with the deviation between the actual rotation speed and the target rotation speed of the engine 21. FIG. 21 is a diagram showing processing according to a modification of the third embodiment. In FIG. 21, the solid line shows the relationship between the deviation between the actual rotation speed of the engine 21 and the target rotation speed during the coasting deceleration and the relief pressures of the relief valves 73 and 74. In FIG. 20, the broken line indicates the relief pressures of the relief valves 73 and 74 in the normal state.

As shown in FIG. 21, the relief pressure during in the normal state is constant at the Pl1. On the other hand, the relief pressure during the coasting deceleration is constant at a value Pl2 smaller than the value Pl1 when the deviation is equal to or greater than the predetermined value dN4, but decreases according to the reduction of the deviation when the deviation is smaller than the predetermined value dN4.

In the control according to the modified example of the third embodiment described above, the controller 72 reduces the relief pressure during the coasting deceleration compared to the normal state. As a result, the HST differential pressure is reduced during the coasting deceleration, whereby the HST braking torque can be suppressed to a small value.

Further, the controller 72 reduces the relief pressure as the deviation becomes smaller in the coasting deceleration. Therefore, as the actual rotation speed of the engine 21 decreases due to the coasting deceleration and approaches the target rotation speed, the relief pressure becomes smaller. Therefore, the closer to the end of the coasting deceleration, the smaller the HST braking torque becomes. Thus, the sense of deceleration at the end of the coasting deceleration can be relaxed.

Although an embodiment of the present invention has been described above, the present invention is not limited to the above embodiment, and various modifications are possible without departing from the gist of the invention.

The work vehicle 1 is not limited to a wheel loader, and may be another type of vehicle such as a motor grader. The configuration of the drive system and the control system of the work vehicle 1 is not limited to those of the above embodiment, and may be changed. For example, the displacement of the travel pump 31 is not limited to the pump control valve 47, but may be controlled by another control valve. In other words, a control valve for controlling the pressure of the hydraulic fluid supplied to the pump control cylinder 46 through the pump pilot circuit 48 may be provided separately from the pump control valve 47.

The parameters used for the above-described various calculations are not limited to those described above, and may be changed. Alternatively, parameters other than the parameters described above may be used for the calculation. The various types of data described above may be represented by, for example, equations, or may be in the form of tables, maps, etc.

The controller 72 may determine the target displacement of the travel pump 31 by a method different from the above-described embodiments. The controller 72 may determine the target displacement of the travel motor 33 by a method different from the above-described embodiments.

The controller 72 may execute two or more of the control according to the first to third embodiments described above and the control according to the modified examples thereof by combining them. The controller 72 may determine whether the work vehicle 1 is in the coasting deceleration in a different manner from the above-described embodiments. For example, the controller 72 may determine whether or not the work vehicle 1 is in the coasting deceleration based on the accelerator operation amount and the vehicle speed detected by the vehicle speed sensor 36.

The relationship between the cut-off frequency of the low-pass filter 72a and the deviation between the actual rotation speed of the engine 21 and the target rotation speed during the coasting deceleration is not limited to that shown in FIG. 11, and may be changed. The relationship between the accelerator operation amount and the cut-off frequency of the low-pass filter 72a during the coasting deceleration is not limited to that shown in FIG. 12, and may be changed.

The relationship between the accelerator operation amount and the lower limit value of the motor displacement during the coasting deceleration is not limited to that shown in FIG. 14 or FIG. 16, and may be changed. The relationship between the lower limit value of the motor displacement and the deviation between the actual rotation speed of the engine 21 and the target rotation speed during the coasting deceleration is not limited to that shown in FIG. 15, and may be changed.

The relationship between the accelerator operation amount and the relief pressure of the relief valves 73 and 74 during the coasting deceleration is not limited to that shown in FIG. 20, and may be changed. The relationship between the relief pressure of the relief valves 73 and 74 and the deviation between the actual rotation speed of the engine 21 and the target rotation speed during the coasting deceleration is not limited to that shown in FIG. 21, but may be changed.

According to the present invention, in a work vehicle, it is possible to easily carry out the gentle coasting travel and improve the fuel consumption.

What is claimed is:

1. A work vehicle comprising:
   an engine;
   a hydrostatic transmission including
      a travel pump configured to be driven by the engine, the travel pump including a first pump port and a second pump port,
      a hydraulic circuit connected to the travel pump, and
      a travel motor including a first motor port and a second motor port, the travel motor being connected to the travel pump through the hydraulic circuit,
      the hydraulic circuit including
         a first circuit connecting the first pump port and the first motor port, and
         a second circuit connecting the second pump port and the second motor port;
   an engine rotation speed sensor configured to output a signal indicative of an actual rotation speed of the engine;
   an accelerator operating member;
   an accelerator operation sensor configured to output a signal indicative of an operation amount of the accelerator operating member; and
   a controller configured to receive a signal from the engine rotation speed sensor and a signal from the accelerator operation sensor, the controller being configured to
      determine a target rotation speed of the engine from the operation amount of the accelerator operating member,
      determine whether the vehicle is in coasting deceleration, and
      decrease a differential pressure between the first circuit and the second circuit in accordance with
         a deviation between the actual rotation speed of the engine and the target rotation speed, or
         the operation amount of the accelerator operating member when the vehicle is in the coasting deceleration.

2. The work vehicle according to claim 1, wherein
the controller is further configured to determine that the vehicle is in the coasting deceleration when the actual rotation speed is greater than the target rotation speed.

3. The work vehicle according to claim 1, wherein
the controller is further configured to slow down a rate of decrease in a command value of a target displacement of the travel pump when the vehicle is in the coasting deceleration.

4. The work vehicle according to claim 3, wherein
the controller includes a low-pass filter, and the controller is further configured to output a command signal indicative of the target displacement to the travel pump through the low-pass filter, and
reduce a cut-off frequency of the low-pass filter in accordance with
   the deviation between the actual rotation speed of the engine and the target rotation speed, or
   the operation amount of the accelerator operating member when the vehicle is in the coasting deceleration.

5. The work vehicle according to claim 1, wherein
the hydrostatic transmission further includes a relief valve provided in the hydraulic circuit, the relief valve being capable of changing a relief pressure,
the controller is further configured to reduce the relief pressure in accordance with
   the deviation between the actual rotation speed of the engine and the target rotation speed, or
   the operation amount of the accelerator operating member when the vehicle is in the coasting deceleration.

6. The work vehicle according to claim 1, wherein
when the vehicle is in the coasting deceleration, the controller is further configured to
   decrease a lower limit value of a displacement of the travel motor compared to a normal state in which the vehicle is not in the coasting deceleration, and decrease the lower limit value of the displacement of the travel motor in response to an increase in the deviation between the actual rotation speed of the engine and the target rotation speed, or a decrease in the operation amount of the accelerator operating member.

7. A work vehicle comprising:

an engine;

a hydrostatic transmission including a travel pump configured to be driven by the engine, a hydraulic circuit connected to the travel pump, and a travel motor connected to the travel pump through the hydraulic circuit;

an engine rotation speed sensor configured to output a signal indicative of an actual rotation speed of the engine;

an accelerator operating member;

an accelerator operation sensor configured to output a signal indicative of an operation amount of the accelerator operating member; and a controller configured to receive a signal from the engine rotation speed sensor and a signal from the accelerator operation sensor, the controller being configured to determine a target rotation speed of the engine from the operation amount of the accelerator operating member, determine whether the vehicle is in coasting deceleration, and decrease a lower limit value of a displacement of the travel motor in accordance with a deviation between the actual rotation speed of the engine and the target rotation speed, or the operation amount of the accelerator operating member when the vehicle is in the coasting deceleration.

8. The work vehicle according to claim 7, wherein the controller is further configured to determine that the vehicle is in the coasting deceleration when the actual rotation speed is greater than the target rotation speed.

9. A method performed by a controller to control a work vehicle, the work vehicle including an engine, a hydrostatic transmission, and an accelerator operating member, the hydrostatic transmission including a travel pump configured to be driven by the engine, the travel pump including a first pump port and a second pump port, a hydraulic circuit connected to the travel pump, a travel motor including a first motor port and a second motor port, the travel motor being connected to the travel pump through the hydraulic circuit, the hydraulic circuit including a first circuit connecting the first pump port and the first motor port and a second circuit connecting the second pump port and the second motor port, the method comprising:

receiving a signal indicative of an operation amount of the accelerator operating member;

receiving a signal indicative of an actual rotation speed of the engine;

determining a target rotation speed of the engine from the operation amount of the accelerator operating member;

determining whether the vehicle is in coasting deceleration; and decreasing a differential pressure between the first circuit and the second circuit in accordance with a deviation between the actual rotation speed of the engine and the target rotation speed, or the operation amount of the accelerator operating member when the vehicle is in the coasting deceleration.

10. A method performed by a controller to control a work vehicle, the work vehicle including an engine, a hydrostatic transmission, and an accelerator operating member, the hydrostatic transmission including a travel pump configured to be driven by the engine, a hydraulic circuit connected to the travel pump, and a travel motor connected to the travel pump through the hydraulic circuit, the method comprising:

receiving a signal indicative of an operation amount of the accelerator operating member;

receiving a signal indicative of an actual rotation speed of the engine;

determining a target rotation speed of the engine from the operation amount of the accelerator operating member;

determining whether the vehicle is in coasting deceleration; and decreasing a lower limit value of a displacement of the travel motor in accordance with a deviation between the actual rotation speed of the engine and the target rotation speed, or the operation amount of the accelerator operating member when the vehicle is in the coasting deceleration.

* * * * *